3,287,346
ASPARAGYL OCTAPEPTIDES AND ACID
ADDITION SALTS THEREOF
Robert Schwyzer, Riehen, and Bernhard Riniker, Reinach, Basel-Land, Switzerland, assignors to Ciba Corporation, New York, N.Y., a corporation of Delaware
No Drawing. Filed June 5, 1963, Ser. No. 285,616
Claims priority, application Switzerland, June 20, 1962, 7,417/62; Mar. 1, 1963, 2,682/63
9 Claims. (Cl. 260—112.5)

The present invention relates to the manufacture of new, highly active isomers of hypertensin II and of its analogues having a hypertensive action, namely the corresponding octapeptides which contain an L-$\beta$- or D-$\beta$- or D-$\alpha$-asparagyl radical, and of their physiologically tolerable acid addition salts. Natural hypertensin II and its analogues of the formula L-asparagyl-L-$\alpha$-(amino-lower alkyl)-amino-acetyl - L - $\alpha$ - amino-lower alkyl-acetyl-L-tyrosyl-L-$\alpha$-aminolower alkyl-acetyl-L-histidyl-L-prolyl-L-phenylalanine which are described in Patent No. 2,978,444, patented April 4, 1961 to Robert Schwyzer et al. are octapeptides consisting entirely of $\alpha$-L-aminoacids. It is highly surprising that the activity is not impaired, and in fact even enhanced when one $\alpha$-L-aminoacid, namely $\alpha$-L-aspartic acid, is replaced by the isomeric $\beta$-amino-acid of the L- or D-form or by $\alpha$-D-aspartic acid.

The new asparagyl-peptides and their salts are about twice as active as the corresponding $\alpha$-L-asparagyl-peptides. A particularly high specific pressor activity is displayed by L-$\beta$-, D-$\alpha$- and D-$\beta$-asparagyl-L-arginyl-L-valyl-L-tyrosyl-L-valyl-L-histidyl-L-prolyl-L-phenylalanine.

The new isomeric octapeptides are obtained by the methods known for the manufacture of peptides, the aminoacids L-aspartic acid, whose $\alpha$-amino group and $\alpha$-carboxyl group are protected, or D-aspartic acid whose $\alpha$-amino and $\alpha$- or $\beta$-carboxyl groups are protected, being linked with an L-$\alpha$-amino-(amino-lower alkyl)-acetic acid, L-$\alpha$-amino-lower alkyl-acetic acid, L-tyrosine, L-$\alpha$-amino-lower alkyl-acetic acid, L-histidine, L-proline, L-phenylalanine or their derivatives in the afore-mentioned order of succession singly or in the form of previously prepared small peptide units. Thus, one of the aminoacid molecules or peptide molecules in the form of an ester may be linked with a further aminoacid molecule or peptide molecule containing a protected amino group in the presence of a condensing agent such as a carbodiimide or of a phosphorus acid ester halide; or the aminoacid ester or peptide ester containing a free amino group may be reacted with an aminoacid or peptide containing an activated carboxyl group (and a protected amino group), for example an acid halide, azide, anhydride, mixed anhydride, imidazolide or isoxazolide (for example from N-ethyl-5-phenyl-isoxazolium-3'-sulfonate), or with an activated ester, such as cyanomethyl ester or carboxymethyl thioester. Conversely, an aminoacid or a peptide containing a free carboxyl group (and a protected amino group) may be reacted with an aminoacid or with a peptide containing an activated amino group (and a protected carboxyl group), for example with a phosphite amide. All of the methods referred to above are suitable for any formation of peptide bonds according to the present invention, but the processes used in the examples are particularly advantageous.

In the processes referred to above the heptapeptide L-$\alpha$-(amino - lower alkyl)-amino-acetyl-L-$\alpha$-amino - lower alkyl-acetyl - L - tyrosyl-L-$\alpha$-amino-lower alkyl-acetyl-L-histidyl-L-prolyl-L-phenylalanine, preferably L-arginyl-L-valyl-L-tyrosyl - L - valyl-L-histidyl-L-prolyl-L-phenylalanine or a derivative, such as an ester thereof, is condensed with a derivative of D-aspartic acid or a D- or L-aspartic acid, whose amino and carboxyl groups attached to the same carbon atoms are protected, and a possibly resulting isomer mixture is separated. The heptapeptides used as starting material are known; they contain as $\alpha$-(amino-lower alkyl)-aminoacetic acid, for example, lysine, ornithine, $\alpha$:$\gamma$-diaminobutyric acid, citrullin or preferably arginine. Radicals of $\alpha$-amino-lower alkyl-acetic acid are above all valyl and iso-leucyl, also leucyl, norleucyl, norvalyl and alanyl. The heptapeptides are accessible by the process described in Patent No. 3,014,023 patented December 19, 1961 to Robert Schwyzer et al.

It is of advantage to protect any free, functional groups not participating in the reaction, more especially by means of radicals that are easy to eliminate by hydrolysis or reduction, the carboxyl group preferably by esterification, for example with a lower alkanol, such as methanol, tertiary butanol, or with benzyl alcohol or para-nitro-benzyl alcohol, or by formation of a mixed anhydride for instance with pivalic acid, or with a carbonic acid lower alkyl ester; the amino group for instance by introducing the tosyl or trityl radical or the carbobenzoxy group or a colored protective group such as the para-phenylazo-benzyloxy-carbonyl group or the para-(para'-methoxyphenylazo)-benzyloxy-carbonyl group or more especially the tertiary butyloxycarbonyl radical. The nitro group is suitable for protecting the amino group in the guanido group of arginine; however, it is not absolutely necessary to protect the aforementioned amino group of arginine during the reaction.

The conversion of a protected $NH_2$ group into a free group, as well as the conversion of a functionally modified carboxyl group into a free carboxyl group in the course of the manufacture of new octapeptides follow the usual practice and consist in a treatment with a hydrolysing or reducing agent respectively.

A resulting mixture of $\alpha$- and $\beta$-isomers can be separated in known manner, for example by counter-current distribution and/or chromatography.

The invention includes also any variant of the present process in which an intermediate obtained at any stage of the process is used as starting material and any remaining step/steps is/are carried out or the process is discontinued at any stage thereof, as well as the intermediates thus obtained.

Depending on the reaction conditions used the new compounds are obtained in the form of bases or of their salts. From the salts the bases can be prepared in known manner. When the bases are reacted with acids capable of forming pharmaceutically useful salts, they furnish salts, for example salts with inorganic acids such as hydrohalic acids, for example hydrochloric or hydrobromic acid, perchloric, nitric or thiocyanic acid, sulfuric or phosphoric acids; or with organic acids such as formic, acetic, propionic, glycollic, lactic, pyruvic, oxalic, malonic, succinic, maleic, furmaric, malic, tartaric, citric, ascorbic, hydroxymaleic, dihydroxymaleic, benzoic, phenylacetic, 4-aminobenzoic, 4-hydroxybenzoic, anthranilic, cinnamic, mandolic, salicylic, 4-aminosalicylic, 2-phenoxybenzoic, 2-acetoxybenzoic, methanesulfonic, ethanesulfonic, hydroxy-ethanesulfonic, benzenesulfonic, paratoluenesulfonic, naphthalenesulfonic or sulfanilic acid.

The octapeptides of the invention may be used in the form of pharmaceutical preparations which contain the peptides in admixture with an organic or inorganic pharmaceutical excipient suitable for enteral or parenteral administration. Suitable excipients are substances that do not react with the polypeptides, for example gelatine, lactose, glucose, sodium chloride, starches, magnesium stearate, talcum, vegetable oils, benzyl alcohols, gums, polyalkylene glycols, white petroleum jelly, cholesterol or other known medicinal excipients. The pharmaceutical prepartions may be, for example, tablets, dragees, powders, ointments, creams or suppositories, or in liquid form solutions, suspensions or emulsions. They may be sterilized and/or may contain assistants such as preservatives, stabilizers, wetting agents or emulsifiers. They may also contain other therapeutically useful substances.

The following examples illustrate the invention.

For the paper-chromatographic examinations the following systems were used:

System 43A=tertiary amyl alcohol+isopropanol+water (100:40:55)
System 43C=tertiary amyl alcohol+isopropanol+water (100:40:55)
System 45=secondary butanol+aqueous ammonia of 3% strength (100:44)
System 52=n-butanol+acetic acid+water (100:10.30)
System 54=secondary butanol+isopropanol+monochloracetic acid+water (70:10:3 g.:40)
System 104=Chloroform+methanol+aqueous ammonia of 17% strength (20:20:9).

EXAMPLE 1

(a) *β-Carbobenzoxy-L-asparagyl-(β-benzyl ester)-L-arginyl-L-valyl-L-tyrosyl-L-valyl-L-histidyl - L-prolyl-L-phenylalanine*

714 mg. of α-carbobenzoxy-L-aspartic acid-α-benzyl ester (see M. Bergmann et al., Ber. 66, page 1288 [1933]) and 0.307 ml. of triethylamine are dissolved in 8 ml. of absolute tetrahydrofuran, cooled to −10° C., and a solution of 0.264 ml. of chloroformic acid isobutyl ester in 2 ml. of tetrahydrofuran is dropped in. The batch is stirred for 15 minutes at −10° C. and then mixed with a solution, cooled to 0° C., of 2.074 grams of L-arginyl-L-valyl-L-tyrosyl-L-valyl-L-histidyl-L-prolyl-L-phenylalanine diacetate and 0.921 ml. of triethylamine in 8 ml. of a 1:1-mixture of tetrahydrofuran and water. Flushing is performed with 4 ml. of solvent and the mixture, which by now has formed two phases, is vigorously stirred for 20 minutes at 0° C., then for 1 hour at 23° C. and for 30 minutes at 40° C.; finally, it is concentrated under vacuum at a bath temperature of 40° C. to about 5 ml., and the precipitated smeary product is mixed with 100 ml. of water, cooled to 0° C., and powdered. The whole is filtered, and the radical is washed with cold water and dried in a high vacuum at 60° C. until its weight remains constant. The crude product (2.3 grams) is purified by being twice recrystallized from methanol+ethyl acetate+petroleum ether. The resulting 2.1 grams of an amorphous powder (melting at about 200° C. with decomposition) still contain about 40% of heptapeptide starting material and are further worked up as they are.

(b) *L-β-asparagyl-L-arginyl-L-valyl - tyrosyl-L-valyl-L-histidyl-L-prolyl-L - phenylalanine (1-βAsp¹, Val⁵-hypertensin II)*

2.05 grams of crude β-carbobenzoxy-L-asparagyl-(β-benzyl ester)-L-arginyl-L-valyl - L-tyrosyl-L-valyl-L-histidyl-L-propyl-L-phenylalanine are dissolved with 1 ml. of glacial acetic acid in 50 ml. of a 7:3-mixture of methanol and water, and hydrogenated under atmospheric pressure at room temperature with 300 mg. of palladium carbon (10% Pd) with absorption of the carbon dioxide formed. After about 15 hours the absorption of hydrogen ceases after slightly more than the calculated amount has been absorbed. The catalyst is filtered off, rinsed with aqueous methanol, and the filtrate is concentrated to 5 ml. and lyophilized, to yield 1.906 grams of crude product which is subjected to a Craig distribution over 184 stages in the system 0.3-molar ammonium acetate:n-butanol:methanol (4:4:1) with a phase volume of 10 ml. each. When the contents of tubes 57–81 are concentrated to a small volume, lyophilized and finish-dried at 45° C., there are obtained 618 mg. of pure L-βAsp¹, Val⁵-hypertensin II as an amorphous powder which decomposes at about 240° C.

$[\alpha]_{364}^{23} = 191.0 \pm 2°$; $[\alpha]_D^{23} = -60.3 \pm 1°$ (c.=1.0 in 0.5 N-sodium hydroxide solution).
$[\alpha]_{364}^{23} = 202.5 \pm 2°$; $[\alpha]_D^{23} = -6.71 \pm 1°$ (c.=1.0 in 0.5 N-hydrochloric acid).

Paper-chromatogram: Rf (45)=0.21; Rf (54)=0.47.
Thin-layer chromatogram on alumina: Rf (45)=0.25; Rf (104)=0.15.

Electrophoresis: Formic acid-acetic acid buffer, pH 2.1, 5 hours 7.5 v./cm.: −15.7 cm. Ammonium acetate buffer, pH 4.75, 16 hours, 5 v./cm.: −9.7 cm. Tris buffer, pH 9.1, 15 hours 5 v./cm.: +0.9 cm.

(Tris buffer=mixture of tri-hydroxymethylaminomethane and hydrochloric acid.)

EXAMPLE 2

When α-carbobenzoxy-D-aspartic acid-α-benzyl-ester is condensed with L-arginyl-L-valyl-L-tyrosyl-L-valyl-L-histidyl-L-prolyl-L-phenylalanine diacetate as described in Example 1, there is obtained β-carbobenzoxy-D-asparagyl-(β-benzyl ester)-L-arginyl-L-valyl-L-tyrosyl-L-valyl-L-histidyl-L-prolyl-L-phenylalanine from which, by elimination of the carbobenzoxy group as described under 1(b), there results D-β-asparagyl-L-arginyl-L-valyl-L-tyrosyl-L-valyl-L-histidyl-L-prolyl-L-phenylalanine (D-β-Asp¹, Val⁵-hypertensin II) which decomposes at about 240° C.

$[\alpha]_{364}^{21} = 175° \pm 2°$; $[\alpha]_D^{21} = -53.3° \pm 1°$ (c.=1.0 in 0.5 N-sodium hydroxide solution).
$[\alpha]_{364}^{21} = 226.5° \pm 2°$; $[\alpha]_D^{21} = -67.8° \pm 1°$ (c.=1.0 in 0.5 N-hydrochloric acid).

EXAMPLE 3

(a) *Nitro - L - arginyl - L - valyl - L - tyrosyl - L - valyl - L - histidyl - L - prolyl - L - phenylalanine methyl ester*

3.0 g. of carbobenzoxy-nitro-L-arginyl-L-valyl-L-tyrosyl-L-valyl-L-histidyl-L-prolyl-L-phenylalanine methyl ester are dissolved with gentle heating in 15 ml. of absolute glacial acetic acid and at 20° C. mixed with 15 ml. of 5 N-hydrobromic acid in glacial acetic acid. The clear, yellow solution is kept for 20 minutes at 20° C. and then concentrated to 15 to 20 ml. in a rotary evaporator, whereupon the reaction product precipitates and forms an oily substance, the hydrobromide. The mixture is then mixed with 50 ml. of absolute ether and triturated at 0° C. The precipitate is thus obtained in a pulverulent form. The amorphous powder (trihydrobromide of the heptapeptide ester) is filtered off and washed on the suction filter with absolute ether. The product is dissolved, without drying, in 15 ml. of water, alkalinized with 2 N-sodium carbonate solution at 0° C. and the resulting precipitate is extracted in a separating funnel with 60 ml. of n-butanol. The butanolic phase is then washed with small portions of 2 N-sodium carbonate solution at 0° C. until a negative bromide reaction is obtained and then with water until the washings run neutral. The butanol is then evaporated, without drying, as it is, in a rotary evaporator until the residue has turned into a thickly liquid magma, which is mixed with 15 ml. of ethyl acetate and 30 ml. of petroleum ether and stirred with heating to 50° C. for a short time, then cooled to 0° C., filtered, and the residue is washed with petroleum ether. The product is dried at 45° C. under a high vacuum, to yield 2.30 g. of nitro-L-arginyl-L-valyl-L-tyrosyl-L-valyl-L-histidyl-L-prolyl-L-phenylalanine methyl ester as an amorphous powder melting at about 150° C.

$[\alpha]_D^{23} = -60.5° \pm 1°$ (c.=1.04 in methanol).
Thin-layer chromatogram on silica gel: Rf (52)=0.23; Rf (43C)=0.36.

The chromatogram of the product reveals only traces of impurities and is used as it is for the condensation leading to the octapeptide.

(b) β - Carbobenzoxy - L - asparagyl - (β - benzyl ester) - nitro - L - arginyl - L - valyl - L - tyrosyl - L -valyl - L - histidyl - L - prolyl - L - phenyl - alanine methyl ester A solution of 714 mg. of α-carbobenzoxy-L-aspartic acid-α-benzyl ester and 0.307 ml. of triethylamine in 6 ml. of absolute tetrahydrofuran is cooled to −12° C. In the course of 2 minutes 0.264 ml. of chloroformic acid isobutyl ester are stirred in dropwise and the mixture is stirred on for 15 minutes at −12° C. A solution (cooled to −10° C.) of 1.952 g. of nitro-L-arginyl-L-valyl-L-tyrosyl-L-valyl-L-histidyl-L-prolyl-L-phenylalanine methyl ester in 5 ml. of absolute dimethylformamide is added, the mixture is stirred for 10 minutes at −10° C., then for 1 hour at 0° C. and for 2 hours at 20° C. Finally, the precipitated triethylammonium chloride is filtered off and washed with 2×2 ml. of tetrahydrofuran+dimethylformamide (2:1). The filtrate is concentrated until it forms a sticky mass and then mixed with 40 ml. of water. By triturating the substance in water it is turned into a powder which is filtered off and dried, to yield 2.4 g. of crude product, which is purified by one precipitation each from methanol+ethyl acetate+petroleum ether and methanol+water, to yield 1.97 g. of β-carbobenzoxy-L-asparagyl-(β-benzyl ester)-nitro-L-arginyl-L-valyl-L-tyrosyl-L-valyl-L-histidyl-L-prolyl-L-phenylalanine methyl ester melting at 175–180° C. with decomposition.

$[\alpha]_D^{23} = -61° \pm 1°$ (c.=1.06 in methanol of 90% strength).

Thin-layer chromatography on silica gel: Rf (43A)= 0.53; Rf (52)=0.64.

The substance contains according to its chromatogram small amounts of 2 or 3 impurities; it is further worked up as it is obtained.

(c)  L - β-asparagyl-L-arginyl-L-valyl-L-tyrosyl-L-valyl-L-histidyl-L-prolyl-L-phenylalanine (L-β-Asp¹, Val⁵-hypertensin II)

A solution of 1.0 g. of β-carbobenzoxy-L-asparagyl-(β-benzyl ester)-nitro-L-arginyl-L-valyl-L-tyrosyl-L-valyl-L-histidyl-L-prolyl-L-phenylalanine methyl ester in a mixture of 15 ml. of methanol and 1.52 ml. of 2 N-hydrochloric acid is mixed with 200 mg. of palladium black (containing 10% of palladium) and hydrogenated with vigorous stirring at 30° C. under atmospheric pressure. The catalyst is then filtered off, the filtrate is concentrated to about 3 ml., diluted with 5 ml. of water and lyophilized. After finally drying the product at 40° C. under a high vacuum, it forms 896 mg. of an amorphous powder consisting of an equimolecular mixture of octapeptide methyl ester hydrochloride and ammonium chloride. To hydrolyse the methyl ester group, the product is dissolved in 4 ml. of water and mixed with 16.24 ml. of an 0.365 N-barium hydroxide solution. The slightly turbid solution is kept for 10 minutes at 25° C. (pH= 12.5) and then mixed with 3.11 ml. of 2 N-sulfuric acid, filtered through a fine-pore glass frit, and the clear filtrate is slowly percolated through a column (length 15 cm., diameter 1 cm.) of weakly basic anion exchange resin (Merck II) in the acetate form. The solution is then concentrated to about 5 ml., lyophilized, and the residue is dried at 45° C. under a high vacuum until its weight remains constant. Yield: 850 mg. of crude product which is purified by being distributed according to Craig over 200 stages in the system 0.3-molar ammonium acetate+n-butanol+methanol (4:4:1) with a phase volume of 10 ml. each. The distribution fractions Nos. 63–87 are evaporated to dryness and the residue is dried at 45° C. under a high vacuum, to yield a total of 570 mg. of pure L-β-Asp¹, Val⁵-hypertensin II.

The paper chromatography, thin-layer chromatography on alumina, and electrophoresis of the product reveal the same values as shown in Example 1. The $[\alpha]_{364}$ and $[\alpha]_D$ values are likewise identical.

EXAMPLE 4

(a) Carbobenzoxy-D-asparagyl-L-arginyl-L-valyl-L-tyrosyl-L-valyl-L-histidyl-L-prolyl-L-phenylalanine 3.24 g. of L-arginyl-L-valyl-L-tyrosyl-L-valyl-L-histidyl-L-prolyl-L-phenylalanine diacetate are dissolved with heating in 30 ml. of absolute dimethylformamide and the solution is cooled to 20° C., whereupon part of the heptapeptide precipitates again. 0.875 ml. of triethylamine and then 778 mg. of solid carbobenzoxy-D-aspartic acid anhydride are then stirred in and stirring is continued for 6 hours at 25° C. The reaction product is then precipitated with 150 ml. of absolute ether, filtered off at 0° C., washed with ether and dried at 45° C. under a high vacuum. Yield: 4.01 g. of a white, amorphous powder melting at about 190° C. with decomposition, containing a mixture of the α- and β-forms of carbobenzoxy-D-asparagyl octapeptide accompanied by carbobenzoxy-D-aspartic acid and heptapeptide.

(b)  D - β - asparagyl - L - arginyl-L-valyl-L-tyrosyl-L-valyl-L-histidyl-L-prolyl-L-phenylalanine (D-β-Asp¹, Val⁵-hypertensin II)

To eliminate the carbobenzoxy group, 5.15 g. of carbobenzoxy - D - asparagyl - L - arginyl - L - valyl - L-tyrosyl-L-valyl-L-histidyl-L-prolyl-L-phenylalanine (mixture of the α- and β-asparagyl peptides; crude product) are heated for 30 minutes in 125 ml. of concentrated hydrochloric acid at 40° C. The solution is evaporated to dryness, and the residue is powdered and dried under a high vacuum at 40° C. The hydrochloride (5.66 g.) is dissolved in 15 ml. of water and converted into the acetate by reaction on a column (20 cm. length, 2.2 cm. diameter) of a weakly basic anion exchange resin (Merck II) washed with 2 N-acetic acid. Finally, the peptide solution is concentrated to 50 ml. and lyophilized, to yield 4.78 g. of an amorphous powder.

The D-β-Asp¹, Val⁵ hypertensin II is separated from the mixture on a column of alumina in the following manner:

Neutral alumina is filled into a column (45 cm. length, 5 cm. diameter) in a mixture of 2 N-ammonia and methanol (1:1) and washed with the solvent mixture until no appreciable amount of inorganic salts can be detected in the eluate. A solution of the 4.78 g. of peptide acetate in 20 ml. of 2 N-ammonia+methanol (1:1) is poured over the column and chromatographed with the identical solvent mixture; fractions of 40 ml. each are collected. Fractions 35–62 are evaporated and dried at 40° C. under a high vacuum until the weight remains constant, to yield a total of 2.34 g. of chromatographically pure D-β-Asp¹, Val⁵ hypertensin II which decomposes at about 240° C.

$[\alpha]_{364}^{21} = -175 \pm 2°$; $[\alpha]_D^{21} = -53.3 \pm 1°$ (c.=1% in 0.5 N-sodium hydroxide solution).

$[\alpha]_{364}^{21} = -226.5 \pm 2°$; $[\alpha]_D^{21} = -67.8 \pm 1°$ (c.=1% in 0.5 N-hydrochloric acid).

Paper-chromatography: Rf (45)=0.21; Rf (54)=0.47.
Thin-layer chromatography on alumina: Rf (45)=0.25; Rf (104)=0.15.
Electrophoresis: Formic acid+acetic buffer, pH 2.1, 5 hours, 7.5 v./cm.: −15.7 cm.; ammonium acetate buffer, pH 4.75, 16 hours, 5 v./cm.: −9.7 cm.; tris buffer, pH 9.1, 15 hours, 5 v./cm.: +0.9 cm.

D - α - asparagyl - L - arginyl-L-valyl-L-tyrosyl-L-valyl-L-histidyl-L-prolyl-L-phenylalanine (D-α-Asp¹, Val⁵ hypertensin II).

Fractions 25–30 of the chromatography on alumina (see under b above) yield on evaporation to dryness 1.61 g. of a mixture of D-α-Asp¹, Val⁵ hypertensin II and L-arginyl - L - valyl-L-tyrosyl-L-valyl-L-histidyl-L-prolyl-L-phenylalanine. To separate it into its two components the material is subjected to a Craig distribution over 90 stages in the system 0.3-molar ammonium acetate+n-butanol with a phase volume of 20 ml. each. The distribution fractions 6 to 16 (maximum in fraction 11; K=0.14)

yield on evaporation to dryness 836 mg. of pure D-α-Asp[1], Val[5] hypertensin II which decomposes at about 230° C.

$[\alpha]_{364}^{21} = -186° \pm 2°$; $[\alpha]_D^{21} = -57.8° \pm 1°$ (c.=1.0 in 0.5 N-sodium hydroxide solution).
$[\alpha]_{364}^{21} = -223.5° \pm 2°$; $[\alpha]_D^{21} = -66.8° \pm 1°$ (c.=1.0 in 0.5 N-hydrochloric acid).

Paper chromatography: Rf (45)=0.21; Rf (54)=0.48.
Thin-layer chromatography on alumin: Rf (45)=0.39; Rf (104)=0.48.
Electrophoresis: Formic acid+acetic acid buffer, pH 2.1, 5 hours, 7.5 v./cm.: −17.3 cm.; ammonium acetate buffer, pH 4.75, 16 hours, 5 v./cm.: −9.7 cm.; tris buffer, pH 9.1, 15 hours, 5 v./cm.: +3.8 cm.

(Tris buffer: mixture of trihydroxymethylaminomethane and hydrochloric acid.)

What is claimed is:
1. L - β - asparagyl-L-α-amino-(amino-lower alkyl)-acetyl - L - α-amino-lower alkyl-acetyl-L-tyrosyl-L-α-amino-lower alkyl-acetyl-L-histidyl-L-prolyl-L-phenylalanine.
2. D - α-asparagyl-L-α-amino-(amino-lower alkyl)-acetyl - L - α - amino-lower alkyl-acetyl-L-tyrosyl-L-α-amino-lower alkyl-acetyl-L-histidyl-L-prolyl-L-phenylalanine.
3. D - β-asparagyl-L-α-amino-(amino-lower alkyl)-acetyl - L - α - amino-lower alkyl-acetyl-L-tyrosyl-L-α-amino-lower alkyl-acetyl-L-histidyl-L-prolyl-L-phenylalanine.
4. L - β - asparagyl-L-arginyl-L-valyl-L-tyrosyl-L-valyl-L-histidyl-L-prolyl-L-phenylalanine and its physiologically tolerable acid addition salts.
5. D - α - asparagyl-L-arginyl-L-valyl-L-tyrosyl-L-valyl-L-histidyl-L-prolyl-L-phenylalanine and its physiologically tolerable acid addition salts.
6. D - β - asparagyl-L-arginyl-L-valyl-L-tyrosyl-L-valyl-L-histidyl-L-prolyl-L-phenylalanine and its physiologically tolerable acid addition salts.
7. Physiologically tolerable acid addition salts of the compounds claimed in claim 1.
8. Physiologically tolerable acid addition salts of the compounds claimed in claim 2.
9. Physiologically tolerable acid addition salts of the compounds claimed in claim 3.

References Cited by the Examiner
UNITED STATES PATENTS

| | | | |
|---|---|---|---|
| 2,581,814 | 1/1954 | Plentl et al. | 260—112.5 |
| 2,710,857 | 6/1955 | Vaughan | 260—112.5 |
| 2,994,692 | 8/1961 | Amiard et al. | 260—112.5 |

LEWIS GOTTS, *Primary Examiner.*
P. A. SMITH, J. R. BROWN, *Assistant Examiners.*